Jan. 17, 1961   A. F. CHAPMAN   2,968,538
DELUSTERING OF FILM
Filed Nov. 15, 1956
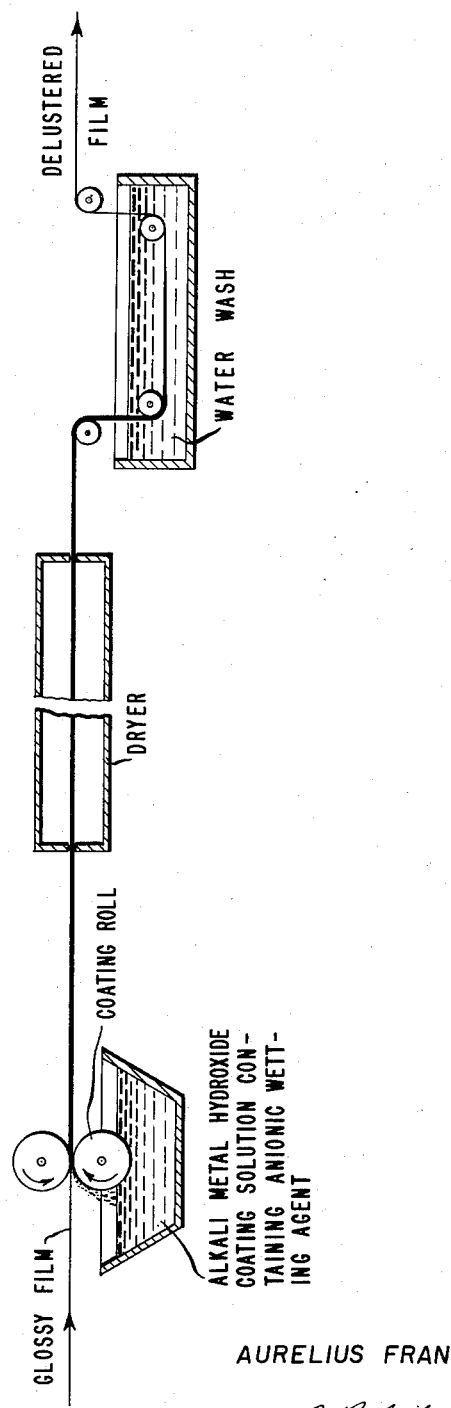
INVENTOR
AURELIUS FRANKLIN CHAPMAN
BY *A. Ralph Snyder*
ATTORNEY United States Patent Office 2,968,538
Patented Jan. 17, 1961

2,968,538

DELUSTERING OF FILM

Aurelius Franklin Chapman, Wilmington, Del., assignor to E. I. du Pont de Nemours and Company, Wilmington, Del., a corporation of Delaware Filed Nov. 15, 1956, Ser. No. 622,479

8 Claims. (Cl. 41—41)

This invention relates to the treatment of synthetic linear polyester structures and, more particularly, to a process for delustering the surface, i.e., reducing the surface glare or light reflectivity, of polyethylene terephthalate film.

Polyethylene terephthalate film cast, as is customary, upon a smooth, polished casting surface, such as a stainless steel belt or drum, takes on the surface smoothness of the casting surface, and the resulting form-stable film possesses a smooth, glossy surface which is highly reflective to light waves. Since the film is transparent and glossy, it is useful in packaging applications because it lends its sparkle to the product contained therein, and the resulting package is attractive by its nature. On the other hand, this high degree of surface reflectivity is a disadvantage of the film when it is to be employed in other types of end uses where dull or non-reflective surfaces are required. It is well-known that polyethylene terephthalate film, particularly in its oriented, heat-set state is useful for lamination to base materials to form wall or floor coverings and coverings for furniture, such as desk tops, counter tops, chair seats, etc. In these laminations the film normally constitutes the top layer of the composition, and it is necessary that the top layer have a low degree of surface reflectivity in order to eliminate glare.

An object of this invention, therefore, is to provide a process for reducing the light reflectivity of the surface of synthetic linear polyester structures. A further object is to provide a simple, economical, non-hazardous process for reducing the light reflectivity of surfaces of polyethylene terephthalate film. A still further object is to deluster the surface of oriented polyethylene terephthalate film. The foregoing and other objects will more clearly appear hereinafter.

These objects are realized by the present invention which, briefly stated, comprises coating the surface of synthetic linear polyester film, such as polyethylene terephthalate film, with a liquid coating composition comprising essentially from 2 to 35% by weight, based on the total weight of the composition, of an alkali metal hydroxide dissolved in a volatile solvent for the hydroxide, and from 2 to 5% of an anionic wetting agent, heating the coated film to drive off the solvent, and thereafter washing the dried film to remove the coating. These essential steps of coating, drying, and washing the film are depicted in the accompanying flow-sheet.

Polyethylene terephthalate films and films of analogous synthetic linear polyesters which respond to the treatment of this invention are those described in U.S.P. 2,465,319 to Whinfield and Dickson. These films may be oriented in one or both directions in accordance with known methods, and heat-set at a temperature of 150° C. and above while being held under tension. Balanced films, i.e., films wherein the physical properties, as measured in both the longitudinal or machine direction and the transverse direction, are substantially the same may be obtained by stretching and/or rolling the unoriented film to substantially the same degree, e.g., about 3X (where X equals the original dimension of the film) in both directions.

Although sodium hydroxide is the preferred alkaline substance and water is the preferred solvent, the hydroxides of the other alkali metals potassium, lithium, casium and rubidium or a mixture of alkali metal hydroxides may be employed with like effect. The concentration of caustic in the coating solution may range from 2 to 35%. The preferred range is from 20 to 25%. Concentrations in excess of 35% adversely affect the stability of the wetting agent, e.g., the wetting agent precipitates out of the caustic solution. Lower concentrations, while not being a factor as regards the stability of the wetting agent in the caustic solution, are not sufficiently effective in producing the desired effect.

In general, any anionic wetting agent containing sulfate or sulfonic acid groups are satisfactory for the purposes of this invention. As specific examples of commercially available anionic wetting agents containing sulfate or sulfonic acid groups there may be mentioned: "Emulsifier H" (sulfonated petroleum aliphatics—Monsanto Chemical Company), "Gammanol" (sulfonated petroleum aliphatics—Griffin Chemical Company), "Intral" 224 (long chain fatty acid sulfate ester containing multiple ether linkages—Synthetic Chemical Company), "Kreelon" 4D (sodium alkyl aryl sulfonate—Wyandotte Chemical Company), "Monosulf" (sulfonated castor oil—National Oil Company), MP–189 (sodium sulfonate of white oil—Du Pont), "Tergitol" Penetrate (alcohol sulfate—Carbide and Carbon), "Teepol" X (sodium alkyl sulfate—Shell Chemical Company), "Ultra-Wet" 30 DS (alkyl aryl sodium sulfonate—Atlantic Refining Company), "Naconal" NR (sodium alkyl aryl sulfonate—Allied Chemical and Dye Corporation), and "Duponol" ME (sodium lauryl sulfate—Du Pont).

The wetting agent in the coating solutions characterizing the process of the present invention imparts to the surface of the film a uniform discontinuous coating of the caustic solution. It is vital that the coating be discontinuous since if it were not and the entire surface of the film were to be uniformly covered, no delustering effect would be realized, but instead a general uniform reduction in thickness without loss of clarity would be noted. It has been found that only an anionic type wetting agent such as alkali metal alkyl sulfates and aryl alkyl sulfonates serves the purpose of uniformly spreading the caustic solution on the film in the form of a discontinuous film. If no wetting agent were used, the caustic would not be spread over the film uniformly but would form haphazardly spaced large droplets. Non-ionic and cationic type wetting agents have not been found effective in this application. The wetting agent, in addition to causing the caustic to lay on the film in the form of a uniformly discontinuous coating, must be stable in the caustic solution. The concentration of wetting agents may range from 2 to 5%. Higher concentrations lead to excessive bubbling and foaming of the solution, while lesser concentrations are ineffective.

When employing aqueous coating solutions, coating is facilitated by incorporating in the coating solution a suitable thickening agent. The thickening agent serves the purpose of imparting sufficient viscosity to the coating solution such that the coating lays uniformly on the film. In general, when aqueous solutions of caustic and wetting agent are used without a thickening agent, the solution will be found to be too thin and will not permit a uniform application of the coating. Preferred thickening agents are sodium alginate, methyl cellulose, and sodium polyacrylate. The amounts of thickening agent applied in the coating formulations depend largely upon the viscosity of the agent. Effective concentrations will generally fall within the range of from 0.5 to 2%.

Organic solvents, e.g., ethyl or butyl alcohol, may be substituted for water in the coating solutions characterizing the process of the present invention. When organic solvents, e.g., butyl alcohol, are employed, the resulting caustic-wetting agent solution may be sufficiently viscous, thereby eliminating the need of a thickening agent. The solution may be applied to one or both sides of the film by any convenient method known to the art, e.g., rolling, spraying, dipping, brushing, doctor rods, doctor knives, etc.

The heat-drying step, which may be carried out by any conventional means, serves to drive off the solvent, leaving uniformly distributed discontinuous deposits of concentrated caustic on the film. During the drying step, the action of the concentrated caustic at these points serves to give the desired delustering effect. As mentioned, if the caustic deposits were spread in the form of a continuous coating over the entire surface, only a reduction in thickness would be noted, with the film retaining its glossy appearance. For coatings applied from aqueous solution, the drying step is preferably carried out at a temperature within the range of from 100° C. to 175° C.

The following specific examples further illustrate the principles and practice of this invention. Percentages are by weight, based on the total weight of the coating solution, unless otherwise indicated.

Example I

An aqueous solution containing 25% sodium hydroxide, 4% Nacconal NR (sodium alkyl aryl sulfonate—Allied Chemical and Dye Corporation) and 1% sodium polyacrylate were applied to 1 mil thick polyethylene terephthalate film (stretched about 3X in both directions and heat-set at 200° C.) by means of a knurled roll on a laboratory gravure printing press. The coating was dried by passing the film through approximately 3 feet of a drying tower heated at 130° C. to 150° C. The coating speed was 1½ ft./min. The dried film was washed free of the caustic coating and dried. A deglossed polyethylene terephthalate film resulted.

Example II

An aqueous solution containing 25% sodium hydroxide, 4% Duponol ME (sodium lauryl sulfate—Du Pont) and 1% sodium alginate were applied to 1 mil thick polyethylene terephthalate film (stretched about 3X in both directions and heat-set at 200° C.) by means of a knurled roll on a laboratory gravure printing press. The coating was dried by passing the film through approximately 3 feet of a drying tower heated at 130° C. to 150° C. The coating speed was 15 ft./min. The dried film was washed free of the caustic coating and dried. A deglossed polyethylene terephthalate film resulted.

Example III

An n-butyl alcohol solution containing 20% potassium hydroxide and 2% Nacconal NR was prepared. This solution was coated on one side of 1 mil thick polyethylene terephthalate film (stretched about 3X in both directions and heat-set at 200° C.) by means of a doctor rod. The coating was dried in an oven in 100° C. for 1 to 2 minutes after which the coating was removed with water. A delustered polyethylene terephthalate film resulted. No thickening agent was employed since the solution was sufficiently viscous to easily coat the film.

Example IV

A 20% solution of potassium hydroxide and "Cellosolve" (ethylene glycol monoethyl ether) was used to coat 1 mil thick polyethylene terephthalate film (stretched about 3X in both directions and heat-set at 200° C.). The coated film was dried at 107° C. for 5 minutes after which the alkali was removed with water. The film thickness was reduced to 0.5 mil but no deglossing was observed. "Cellosolve" is an excellent solvent for potassium hydroxide and is also an excellent wetting agent for polyethylene terephthalate film.

Example V

A coating consisting of 23 parts of 85% phenol and 8 parts sodium hydroxide was prepared in 30 parts of normal butyl alcohol. The sodium phenolate solution was used to handcoat 2 mils thick polyethylene terephthalate film (stretched about 3X in both directions and heat-set at 200° C.). The coating was dried for 10 minutes at 130° C. after which the delustering agent was removed. A deglossed polyethylene terephthalate film resulted. Sodium phenolate serves as an anionic wetting agent as well as a delustering agent.

Example VI

To a solution of benzyl trimethyl ammonium hydroxide in methanol was added sufficient aqueous Nacconal NR to give a 2% concentration of the wetting agent, based on the total weight of the solution. Next a small amount of sodium polyacrylate was added to impart to the solution the proper viscosity for coating. A 2 mil, biaxially-oriented, heat-set polyethylene terephthalate film was coated on one side with this solution after which the coated film was heated in an oven for 30 minutes at 130° C. The water-soluble coating was then removed (washed) from the film and the film redried. The resulting film was effectively delustered.

Example VII

An aqueous solution of sodium hydroxide (25%) containing "Nacconal" NR (4%) and sodium polyacrylate (1%) was applied to a heavy fabric sample of polyethylene terephthalate designated as "sail cloth" (the sailcloth fabric was prepared from 150 denier, 68 filament polyethylene terephthalate continuous filament yarn having a twist of 3.5 turns per inch. The fabric is a plain taffeta weave having 80 ends per inch in the warp and 66 ends per inch in the filling) by means of a doctor knife. The wet sample was dried for 1 minute at 135° C., washed free of caustic and redried. The sample was satisfactorily delustered and was not degraded by the caustic.

Example VIII

A stock solution of 25% sodium hydroxide, 4% "Nacconal" NR, 1% sodium polyacrylate, and 70% water was diluted to a 5% sodium hydroxide by the addition of water. A sample of marquisette fabric (the marquisette fabric was prepared from 70 denier, 34 filament polyethylene terephthalate continuous filament yarn having a twist of 20 turns per inch. The fabric is a leno weave having 52 ends per inch in the warp and 34 ends per inch in the filling) was immersed in a bath of the 5% caustic solution. The excess liquid was removed with filter paper. The impregnated fabric was dried at 135° C. for 2 minutes, washed, and redried. The sample was delustered and no degradation of the fibers was observed.

In addition to treating crystalline polyethylene terephthalate film which has been oriented by stretching and/or rolling in two directions and heat-set, amorphous unoriented polyethylene terephthalate film or crystalline unoriented polyethylene terephthalate film may also be delustered under the conditions of the present process as hereinabove set forth.

The aqueous coating solutions, featured in the process of the present invention, are administered at room temperature, thus eliminating the hazard of handling hot caustic solutions. The coating solutions are composed of readily available and comparatively inexpensive components. The solutions may be used repeatedly for relatively long periods of time, and the main ingredient, water-soluble alkali metal hydroxide, is readily washed from the film surface by immersing the film in water after drying. The present process may be readily employed as a step in the process for forming film. That is, the film, subsequent to stretching and/or rolling in two directions, and heat-setting, may be continuously drawn through an aqueous bath containing the caustic, wetting and thickening agents, and thereafter dried, washed and re-dried prior to rewinding. On the other hand, this process may be used conveniently as a step prior to, or subsequent to the process of dyeing or coloring the film. It is necessary that the film be relatively clean prior to entering the coating solution, but the film may be wet (with water) or dry prior to treatment. Therefore, the process may be conveniently employed as an initial or final step of any other process wherein the film is dyed, embossed, stamped, etc.

For the most end uses it will be sufficient to coat one side of the film only with the delustering solution. However, it is entirely within the scope of the present invention to apply the coating solution by any known expedient to both sides of the film.

Polyethylene terephthalate film treated in accordance with the present process may be employed in a wide variety of end uses, particularly in laminations which are to be employed in walls, ceilings, or floor constructions. Furthermore, this treated film is excellent for the top ply of laminations which may be employed for desk tops, counter tops, table tops, scuff-proof interiors for automobiles, and in other types of construction wherein the reflection of light from surfaces must be reduced. Furthermore, the present treated film is highly successful as a protective envelope for covering television picture tubes and similar types of cathode ray tubes. The treated film is also useful for covering other types of glass containers including fluorescent lighting tubes, photo-flash bulbs, incandescent light bulbs, and the like.

I claim:

1. A process for delustering the surface of shaped structures of polyethylene terephthalate which comprises the steps, in sequence, of treating the surface with a solution containing 2–35% by weight of an alkali metal hydroxide and 2–5% by weight of an anionic wetting agent in a volatile solvent; heating the treated structure to drive off the solvent; and thereafter washing the alkali metal hydroxide from the surface of the shaped structure.

2. The process of claim 1 wherein the shaped structure is film.

3. The process of claim 1 wherein the shaped structure is biaxially-oriented, heat-set, polyethylene terephthalate film.

4. The process of claim 1 wherein the shaped structure is woven fabric.

5. A process as in claim 1 wherein the anionic wetting agent is selected from the group consisting of a wetting agent containing at least one sulfate group, a wetting agent containing at least one sulfonic acid group and sodium phenolate.

6. A process as in claim 1 wherein the solvent is water and the solution contains a thickening agent.

7. A process as in claim 1 wherein the alkali metal hydroxide is sodium hydroxide.

8. A process for delustering the surface of shaped structures of polyethylene terephthalate which comprises the steps, in sequence, of treating the surface at room temperature with an aqueous solution containing 20–25% by weight of sodium hydroxide and 2–5% by weight of an anionic wetting agent selected from the group consisting of a wetting agent containing at least one sulfate group, a wetting agent containing at least one sulfonic acid group and sodium phenolate; heating the treated structure to a temperature of at least 100° C. to drive off water; and thereafter washing the structure with water to remove sodium hydroxide from the surface thereof.

References Cited in the file of this patent

UNITED STATES PATENTS

| | | |
|---|---|---|
| 2,067,463 | Schirm | Jan. 12, 1937 |
| 2,314,285 | Morgan | Mar. 16, 1943 |
| 2,590,402 | Hall et al. | Mar. 25, 1952 |
| 2,607,656 | Ridge | Aug. 19, 1952 |
| 2,653,861 | Meyer | Sept. 29, 1953 |
| 2,678,285 | Browning | May 11, 1954 |
| 2,741,051 | Reissig | Apr. 10, 1956 |
| 2,757,064 | Speck | July 31, 1956 |
| 2,781,242 | Knapp | Feb. 12, 1957 |

FOREIGN PATENTS

| | | |
|---|---|---|
| 610,136 | Great Britain | Oct. 12, 1948 |

OTHER REFERENCES

Marsh: Mercerising; D. Van Nostrand Co., Inc., New York, 1942; pp. 119–122.